US006637842B2

(12) United States Patent
Elm et al.

(10) Patent No.: US 6,637,842 B2
(45) Date of Patent: Oct. 28, 2003

(54) SWITCHGEAR CABINET

(75) Inventors: Oskar Elm, Dietzhölztal (DE); Jürgen Zachrai, Dillenburg (DE); Uwe Schauwecker, Herborn (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 09/992,484

(22) Filed: Nov. 14, 2001

(65) Prior Publication Data
US 2002/0084728 A1 Jul. 4, 2002

(30) Foreign Application Priority Data
Nov. 25, 2000 (DE) ......................................... 100 58 260

(51) Int. Cl.⁷ .............................................. E05B 65/46
(52) U.S. Cl. ...................................... 312/217; 292/171
(58) Field of Search ................................ 312/215, 222, 312/218, 219, 217; 292/157, 166, 171

(56) References Cited

U.S. PATENT DOCUMENTS

| | | | | |
|---|---|---|---|---|
| 2,547,513 A | * | 4/1951 | Wikman ...................... 109/53 |
| 3,109,686 A | * | 11/1963 | Watts et al. ................. 312/215 |
| 4,352,529 A | * | 10/1982 | Steinke ........................ 312/222 |
| 4,469,382 A | * | 9/1984 | Slaats et al. ................. 312/219 |
| 5,044,678 A | * | 9/1991 | Detweiler .................... 292/144 |
| 5,720,535 A | * | 2/1998 | Mehman ..................... 312/219 |
| 6,401,940 B1 | * | 6/2002 | Hartel et al. .................. 211/26 |

FOREIGN PATENT DOCUMENTS

DE      195 07 852      8/1996

* cited by examiner

Primary Examiner—Lanna Mai
Assistant Examiner—Jerry A. Anderson
(74) Attorney, Agent, or Firm—Pauley Petersen & Erickson

(57) ABSTRACT

A switchgear cabinet with at least one cabinet door, which can be locked by a lock element of the switchgear cabinet body wherein, in a locked position of the cabinet door, a locking engagement between the lock element and a counter-lock element can be released by a triggering device, which is in an operative connection with the lock element or the counter-lock element via an actuating unit. So that the cabinet door can be opened in a simple way from the inside of the switchgear cabinet, the actuating unit of this invention is designed as a Bowden cable, with one end connected to the triggering device via a connecting element and an other end connected with the lock element or the counter-lock element. The triggering device has a rotary body which is pivotably seated about an axis of rotation. The end of the Bowden cable is fastened eccentrically offset with respect to the axis of rotation on the rotary body, and a lever with a handle is connected to the rotary body.

15 Claims, 3 Drawing Sheets

SWITCHGEAR CABINET

BACKGROUND OF THE INVENTION

1. Field of the Invention

This invention relates to a switchgear cabinet with at least one cabinet door, which can be locked by a lock element of the switchgear cabinet body wherein, in the locked position of the cabinet door the locking engagement between the lock element and the counter-lock element can be released by a triggering device, which is in an operative connection with the lock element or the counter-lock element via an actuating unit.

2. Description of Related Art

Such a switchgear cabinet is known from German Patent Reference DE 195 07 852 C1. A sliding bolt mechanism is attached to the inside of the cabinet door as the lock element and can be actuated from the front of the door by a handle arrangement. In the locked position of the cabinet door, the sliding bolt mechanism is in an operative connection with lock elements arranged on the switchgear cabinet. It is possible, for example, for a door to be hingedly connected with a switchgear cabinet which does not have a handle mechanism arranged on the outside of the door. Such cabinet doors are customarily locked via sliders, bolts or the like on the inside and are difficult to operate.

Also, access is hindered because of installations inside the cabinet.

SUMMARY OF THE INVENTION

It is one object of this invention to provide a switchgear cabinet of the type mentioned above but wherein the cabinet door can be unlocked in a simple manner.

This object is attained with an actuating unit designed as a Bowden cable, with one end connected to the triggering device via a connecting element and an other end connected with the lock element or the counter-lock element. The triggering device has a rotary body, which is pivotally seated about an axis of rotation. The end of the Bowden cable is fastened eccentrically offset with respect to the axis of rotation on the rotary body, and a lever with a handle is connected on the rotary body.

With this arrangement it is possible to install the triggering device and the counter-lock element independently of each other. The triggering device is preferably positioned in such a way that it is easily accessible. The Bowden cable is used for remote control, with which the counter-lock element, and therefore the unlocking of the cabinet door, can be controlled. The unlocking force is introduced to the triggering device via the handle and is stepped down by the handle and the rotary body. It is thus possible to generate a triggering force of sufficient strength.

In accordance with a preferred embodiment of this invention, at least two cabinet doors can be hingedly connected with the cabinet body. The first cabinet door is maintained in the locked position by the locking engagement between the lock element and the counter-lock element. The triggering device is maintained in the area of the switchgear cabinet interior, which is accessible through the opened second cabinet door. The first cabinet door can be secured in a known manner, for example with a lock device which can be operated from the outside of the door. Once this cabinet door is opened, the second cabinet door can be easily unlocked by means of the triggering device.

In another embodiment of this invention, the counter-lock element has a displaceable bolt which, in the locked position of the cabinet door, cooperates with the lock element embodied as a lock hook. The bolt is held, biased by a spring, in the locked position in a receiving housing of the counter-lock element. The bolt can be displaced counter to the spring bias into the open position by the Bowden cable. The bolt is always maintained in the locking position by a spring, so that an inadvertent release of the lock is assuredly prevented.

In order to achieve an exact alignment of the counter-lock element in a prepared mounting position, in one embodiment of this invention the counter-lock element has two contact sections arranged at an angle with respect to each other and resting against two profiled sides of a profiled frame section of the switchgear body and aligned with them.

It is also possible for the profiled frame section to have one or more rows of fastening receivers extending in the longitudinal profile direction. The counter-lock element engages one or more of the fastening receivers with one or several hook elements.

In to order to adjust the lock in a simple manner, the counter-lock element has a holder, on which the Bowden cable is supported by a set screw on its outer cover. The core of the Bowden cable is passed through the set screw to the bolt and the holder is connected in one piece with the counter-lock element. Because the set screw is assigned directly to the counter-lock element, it is possible to adjust the bolt in a simple and exact manner.

If the Bowden cable is guided in an area of a hollow chamber enclosed by a profiled frame section of the switchgear cabinet body, the Bowden cable does not hinder installation conditions in the switchgear cabinet interior.

In one embodiment of this invention, the counter-lock element and the triggering device each form a component connected with the cabinet body. Thus the lock device forms a component set which can be installed simply and quickly, and can also be retrofitted.

If large cabinet doors are employed, at least two lock elements are provided on the cabinet door with a counter-lock element assigned to each one, and the triggering device releases both counter-lock elements simultaneously.

BRIEF DESCRIPTION OF THE DRAWINGS

This invention is explained in greater detail in view of an exemplary embodiment shown in the drawings, wherein.

DESCRIPTION OF PREFERRED EMBODIMENTS

Figure 1:
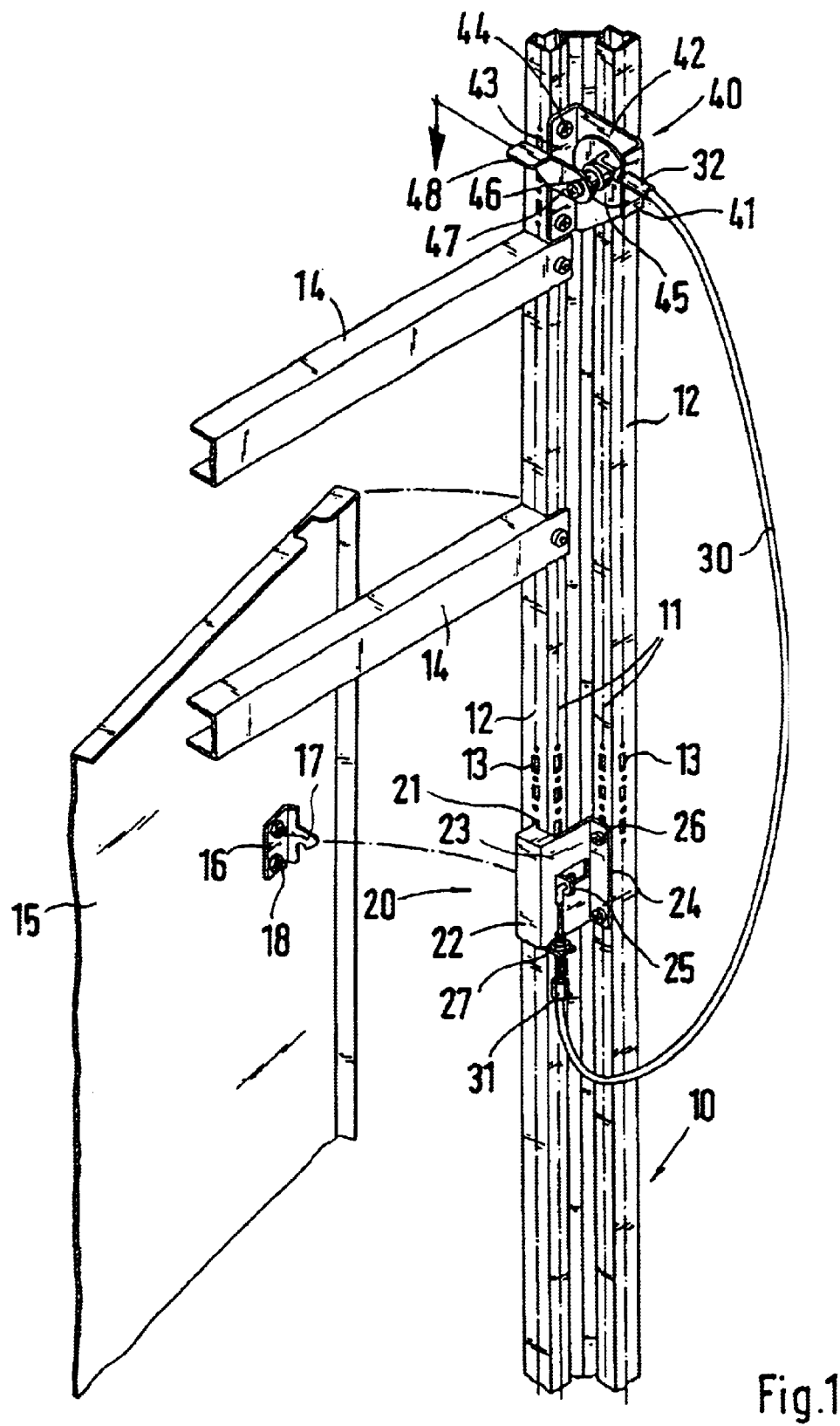
FIG. 1 shows a switchgear cabinet with a lock device installed in a partial and perspective plan view.

A section of a switchboard cabinet is shown in FIG. 1. The switchgear cabinet has a rack assembled from horizontal and vertical profiled frame sections 10. The vertical profiled frame sections 10 have four profiled sides 11 and 12. Each of the profiled sides 12 extends at a right angle in relation to the associated outside of the switchgear cabinet. The profiled sides 11 adjoin the profiled sides 12 at right angles and therefore extend parallel relative to the associated outsides. Each one of the profiled sides 11, 12 has a row of fastening receivers 13 preferably arranged evenly spaced apart from each other.

The open front of the switchgear cabinet can be closed by one or several doors 15 arranged in front of each other.

Transverse struts 14 are arranged between the two vertical profiled frame sections 10 at the front.

A lock element 17 is fastened on the inside of the door 15. The lock element 17 supports a lock hook. A fastening plate 16 extends at a right angle from the lock hook. The fastening plate 16 has two screw receivers, through which threaded bolts 18 pass. The threaded bolts 18 are welded to the inside of the door 15. The lock element 17 can be fastened on the door 16, such as with nuts screwed on the threaded bolts 18.

A lock arrangement, having a counter-lock element 20, a Bowden cable 30 and a triggering device 40, is attached to the vertical profiled frame section 10 shown in FIG. 1. The counter-lock element 20 has a contact section 24, from which a further contact section 23 extends at right angles. The contact section 24 has two screw receptacles aligned with the fastening receivers in the profiled side 11 of the vertical profiled frame section 10. Fastening screws 26 can be passed through the fastening receivers and screwed into the fastening receivers which are arranged in an aligned manner. On its side remote from the contact section 24, the contact section 23 has a receiver housing 22. The receiver housing 22 is angled off in one piece from the contact section 23. A bolt 25 is displaceably housed in the receiver housing 22. On a side facing the exterior of the switchgear cabinet, the receiver housing 22 has an opening, through which the lock hook of the lock element 17 is passed in the locked state of the door 15. In the locked position of the door 15, the lock hook is locked with the bolt 25 in the receiver housing 22. A sheet metal flap in the form of a holder 27 is bent away from an underside of the receiver housing 22. The holder 27 has a thread, into which a set screw 31 can be screwed. The set screw 31 is a part of the Bowden cable 30. The core of the Bowden cable 30 is hooked into a hole in the bolt 25. The outer sheathing of the Bowden cable 30 abuts the set screw 31.

On its end remote from the counter-lock element 20, the Bowden cable 30 is connected to the triggering device 40 by a connecting element 32. The triggering device 40 has a punched and bent element with a fastening plate 43 and a lateral element 42 formed on it at right angles. An edge 41 is bent at right angles away from the lateral element 42. The edge 41 has the connecting element 32. The triggering device 40 can be screwed to the vertical profiled frame section 10 by means of the fastening plate 43, for which purpose fastening screws 44 are screwed into fastening receivers 13 of the profiled side 11 arranged on the front of the vertical profiled frame section 10. A shaft 46 is rotatably seated on the lateral element 42. The shaft 46 supports a rotary body 45. In the present case, the rotary body 45 is embodied as a disk and is connected, fixed against relative rotation, with the shaft 46. On its projecting end facing away from the lateral element 42, a lever 47 is connected, fixed against relative rotation, with the shaft 46. The lever 47 has a handle 48.

For assembling the lock arrangement, first the counter-lock element 20 is fastened to the vertical profiled frame section 10. During this the bolt 25 is aligned in relation to the lock element 17. Initially, exact alignment is possible because the contact sections 23, 24 are aligned with the facing profiled sides 11. Moreover, hook elements 21 project away from the receiver housing 22, which can be suspended in fastening receivers 13 embodied in the form of slits in the front profiled side 12 of the vertical profiled frame section 10. Once the counter-lock element 20 is mounted on the vertical profiled frame section 10, the bolt 25 can be adjusted by the set screw 31. The bolt 25 is maintained in the closed position by spring bias.

The triggering device 40 can be arranged at a location in the interior of the switchgear cabinet which is easily accessible, as shown in FIG. 1. When the handle 48 is operated, the rotary body 45 rotates. The core of the Bowden cable 30 is suspended on the rotary body 45 by means of a hook. Thus, when the rotary body 45 is rotated, the core is pulled and the bolt 25 of the counter-lock element 20 is moved into its unlocked position. The door 15 can be opened. A seal is customarily foamed onto the inside of the door and acts together with a corresponding sealing edge of the vertical profiled frame section 10 and the transverse strut 14. The seal is pressed against the sealing edge and is maintained in a biased manner. If the bolt 25 is released, the door springs automatically into the open position because of the contact pressure of the seal. The handle 48 can be released once the door is open. Since the bolt 25 is biased by a spring, the lever 47 automatically returns into its initial position.

Figure 2:
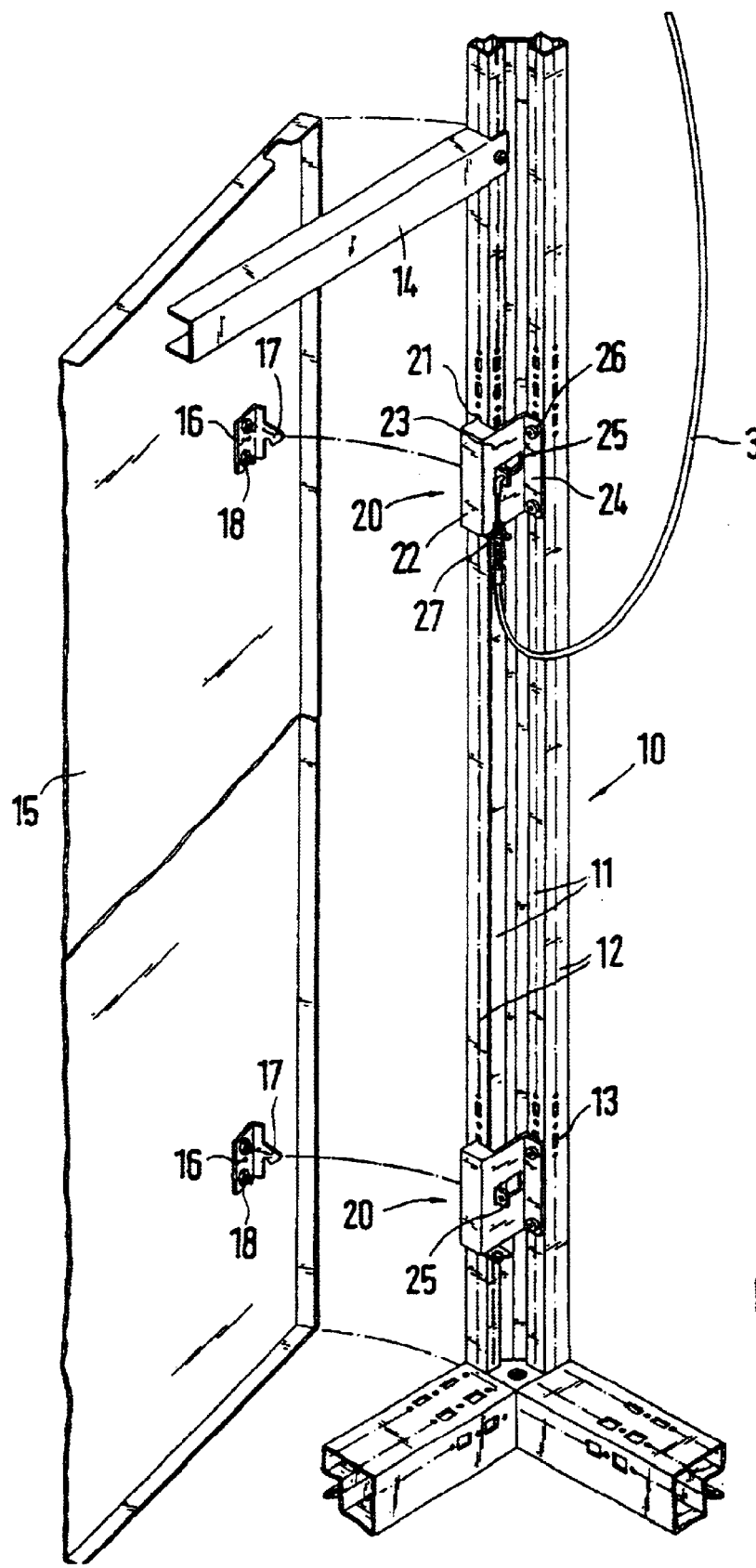
FIG. 2 shows a switchgear cabinet with a lock device for two-point locking in a partial perspective plan view.

As shown in FIG. 2, two or several counter-lock elements 20 and correspondingly two or more lock elements 17 can also be used, in particular with large cabinet doors 15. The bolt 25 of the lower counter-lock element then can either be controlled directly from the triggering device 40 by means of a separate Bowden cable 30. Alternatively, it is possible for the two bolts 25 of the two counter-lock elements 20 to be connected by a Bowden cable 30 or another suitable cable.

Figure 3:
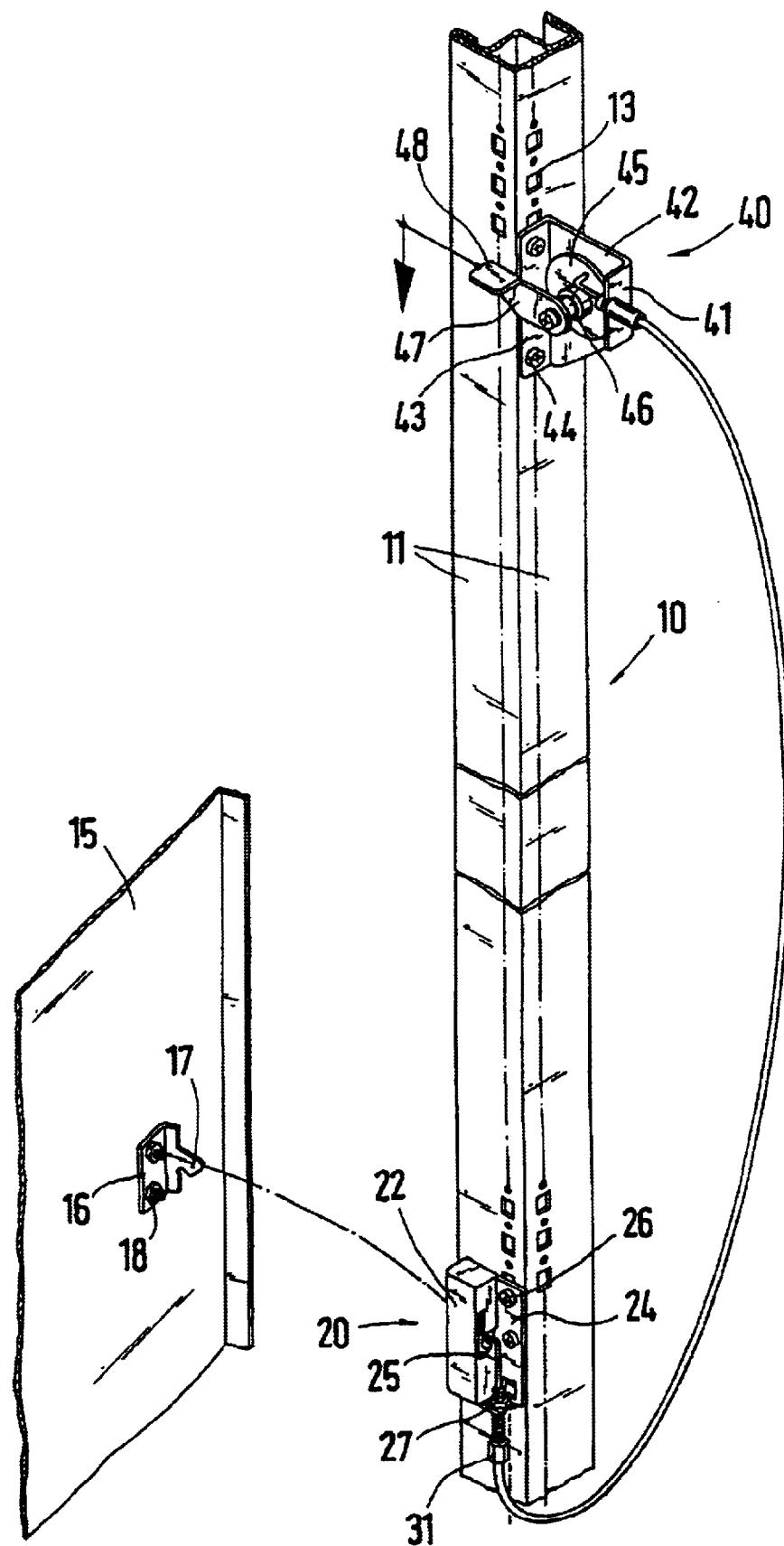
FIG. 3 shows another embodiment of a switchgear cabinet with a lock device, according to this invention.

The embodiment of a lock arrangement is shown in FIG. 3, which is matched to a rack with a cross-sectional geometry which is changed with respect to the vertical profiled frame section 10. The triggering device 40 corresponds to the triggering devices used in FIGS. 1 and 2. The counter-lock element 20 is matched to the changed profile geometry. Functioning of the arrangement described in FIG. 3 corresponds to the functioning of the lock arrangement in accordance with FIG. 1 and FIG. 2.

What is claimed is:

1. In a switchgear cabinet having at least one cabinet door mounted to a cabinet body, wherein the cabinet door can be locked by a lock element of the cabinet body, in a locked position the cabinet door closes an opening in the cabinet body, a locking engagement between the lock element and a counter-lock element can be released by a triggering device that operates the lock element or the counter-lock element via an actuating unit, and in the locked position the triggering device is accessible from outside the cabinet body, the improvement comprising:

the actuating unit formed as a Bowden cable (30) with a first end connected to the triggering device (40) via a connecting element (32) and a second end connected with the lock element (17) or the counter-lock element (20);

the triggering device (40) having a rotary body (45) pivotably seated about an axis of rotation;

the first end of the Bowden cable (30) fastened to the rotary body (45) of the trigger device at a position eccentrically offset from the axis of rotation on the rotary body (45);

a lever (47) with a handle (48) connected to the rotary body (45), at least two cabinet doors (15) hingedly connected with the cabinet body, a first cabinet door of the at least two cabinet doors (15) maintained in the locked position by locking engagement between the lock element (17) and the counter-lock element (20), and the triggering device (40) maintained near the switchgear cabinet interior and accessible through the opening in the cabinet body.

2. In the switchgear cabinet in accordance with claim 1, wherein the counter-lock element (20) has a bolt (25) which in the locked position engages a lock hook of the lock element (17), the bolt (25) is biased toward the locked position by a spring in a receiving housing (22) of the counter-lock element (20), and the bolt (25) is displaced counter to the spring bias into the open position by the Bowden cable (30).

3. In the switchgear cabinet in accordance with claim 2, wherein the counter-lock element (20) has two contact sections (23, 24) arranged at an angle with respect to etch other and each of said sections resting against and aligned with a profiled side (11) of a profiled frame section (10) of the cabinet body.

4. In the switchgear cabinet in accordance with claim 3, wherein the profiled frame section (10) has at least one row of fastening receivers (13) extending in a longitudinal profile direction, and the counter-lock element (20) engages the at least one of the fastening receivers (13) with at least one hook element (21).

5. In the switchgear cabinet in accordance with claim 4, wherein the counter-lock element (20) has a holder (27) on which the Bowden cable (30) is supported by a set screw on an outer cover, a core of the Bowden cable (30) passes through the set screw to the bolt (25), and the holder (27) is connected in one piece with the counter-lock element (20).

6. In the switchgear cabinet in accordance with claim 5, wherein the Bowden cable (30) is guided within a chamber formed by the cabinet body.

7. In the switchgear cabinet in accordance with claim 6, wherein the counter-lock element (20) forms a component connected with the cabinet body.

8. In the switchgear cabinet in accordance with claim 7, wherein at least two lock elements (17) are provided on the cabinet door (15), with a counter-lock element (20) assigned to each one, and the triggering device (40) releases the counter-lock elements (20) simultaneously.

9. In a switchgear cabinet having at least one cabinet door mounted to a cabinet body, wherein the cabinet door can be locked by a lock element of the cabinet body, in a locked position the cabinet door closes an opening in the cabinet body, a locking engagement between the lock element and a counter-lock element can be released by a triggering device that operates the lock element or the counter-lock element via an actuating unit, and in the locked position the triggering device is accessible from outside the cabinet body, the improvement comprising:

the actuating unit formed as a Bowden cable (30) with a first end connected to the triggering device (40) via a connecting element (32) and a second end connected with the lock element (17) or the counter-lock element (20);

the triggering device (40) having a rotary body (45) pivotably seated about an axis of rotation;

the first end of the Bowden cable (30) fastened to the rotary body (45) of the trigger device at a position eccentrically offset from the axis of rotation on the rotary body (45);

a lever (47) with a handle (48) connected to the rotary body (45), a counter-lock element (20) having two contact sections (23, 24) arranged at an angle with respect to each other and each of said sections resting against and aligned with a profiled side (11) of a profiled frame section (10) of the cabinet body.

10. In the switchgear cabinet in accordance with claim 9, wherein the counter-lock element (20) has a bolt (25) which in the locked position engages a lock hook of the lock element (17), the bolt (25) is biased toward the locked position by a spring in a receiving housing (22) of the counter-lock element (20), and the bolt (25) is displaced counter to the spring bias into the open position by the Bowden cable (30).

11. In a switchgear cabinet having at least one cabinet door mounted to a cabinet body, wherein the cabinet door can be locked by a lock element of the cabinet body, in a locked position the cabinet door closes an opening in the cabinet body, a locking engagement between the lock element and a counter-lock element can be released by a triggering device that operates the lock element or the counter-lock element via an actuating unit, and in the locked position the triggering device is accessible from outside the cabinet body, the improvement comprising:

the actuating unit formed as a Bowden cable (30) with a first end connected to the triggering device (40) via a connecting element (32) and a second end connected with the lock device (17) or the counter-lock element (20);

the triggering device (40) having a rotary body (45) pivotably seated about an axis of rotation;

the first end of the Bowden cable (30) fastened to the rotary body (45) of the trigger device at a position eccentrically offset from the axis of rotation on the rotary body (45);

a lever (47) with a handle (48) connected to the rotary body (45), a profiled frame section (10) having at least one row of fastening receivers (13) extending in a longitudinal profile direction, and the counter-lock element (20) engaging the at least one of the fastening receivers (13) with at least one hook element (21).

12. In the switchgear cabinet in accordance with claim 11, wherein at least two lock elements (17) are provided on the cabinet door (15), with a counter-lock element (20) assigned to each one, and the triggering device (40) releases the counter-lock elements (20) simultaneously.

13. In the switchgear cabinet in accordance with claim 12, wherein the counter-lock element (20) has a holder (27) on which the Bowden cable (30) is supported by a set screw on an outer cover, a core of the Bowden cable (30) passes though the set screw to the bolt (25), and the holder (27) is connected in one piece with the counter-lock element (20).

14. In the switchgear cabinet in accordance with claim 12, wherein the Bowden cable (30) is guided within a chamber formed by the cabinet body.

15. In the switchgear cabinet in accordance with claim 12, wherein the counter-lock element (20) forms a component connected with the cabinet body.

* * * * *